US012253819B2

(12) United States Patent
Jeran et al.

(10) Patent No.: US 12,253,819 B2
(45) Date of Patent: Mar. 18, 2025

(54) RESETTING PRINTING DEVICE CONSUMABLE ITEM REMAINING LIFE

(71) Applicant: Hewlett-Packard Development Company, L.P., Spring, TX (US)

(72) Inventors: Paul L. Jeran, Boise, ID (US); Gabriel Scott McDaniel, Boise, ID (US); Jeffrey H. Luke, Boise, ID (US); Benjamin D. Nielsen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 166 days.

(21) Appl. No.: 17/885,811

(22) Filed: Aug. 11, 2022

(65) Prior Publication Data

US 2024/0051306 A1 Feb. 15, 2024

(51) Int. Cl.

| | |
|---|---|
| ***G03G 15/00*** | (2006.01) |
| ***G03G 15/08*** | (2006.01) |
| ***G03G 21/18*** | (2006.01) |

(52) U.S. Cl.
CPC ....... *G03G 15/553* (2013.01); *G03G 15/0863* (2013.01); *G03G 15/556* (2013.01); *G03G 21/1892* (2013.01); *G03G 2215/0697* (2013.01)

(58) Field of Classification Search
CPC ............. G03G 15/0863; G03G 15/553; G03G 15/556; G03G 21/1892
USPC ....................................... 399/12, 14, 25, 109
See application file for complete search history.

(56) References Cited

U.S. PATENT DOCUMENTS

| | | | | |
|---|---|---|---|---|
| 6,295,423 | B1 | 9/2001 | Haines et al. | |
| 8,891,983 | B2 | 11/2014 | Tamagaki et al. | |
| 2014/0093258 | A1 * | 4/2014 | Thacker | B41J 2/17546 399/27 |

* cited by examiner

*Primary Examiner* — Hoang X Ngo
(74) *Attorney, Agent, or Firm* — Michael Dryja

(57) ABSTRACT

A printing device determines that a consumable item newly installed within a printing device has previously been used, based on a remaining life of the consumable item. In response to determining that the consumable item has previously been used, the printing device resets the remaining life of the consumable item.

20 Claims, 8 Drawing Sheets

RESETTING PRINTING DEVICE CONSUMABLE ITEM REMAINING LIFE

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

DETAILED DESCRIPTION

Figure 1A:
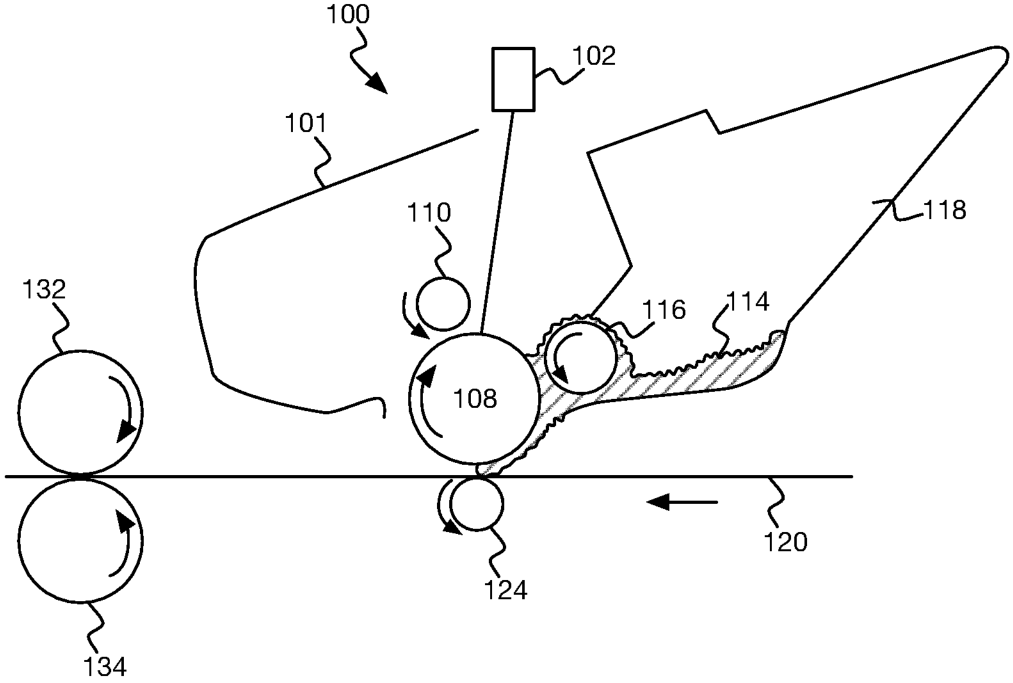
FIGS. 1A and 1B are a diagram and a block diagram, respectively, of an example toner cartridge for a laser printing device.

As noted in the background, printing devices deposit print material to form images on media or, in the case of three-dimensional (3D) printing devices, to additively build (3D) objects. A printing device can include a cartridge of print material, such as a toner cartridge in the case of a laser printing device, which the device uses for printing. As the device prints print jobs, print material is consumed from the cartridge. When the cartridge is empty or is running low on print material, the cartridge may be replaced with a replacement that has a fresh (e.g., full) supply of print material.

A cartridge, such as a toner cartridge, is thus one type of a consumable item that a printing device uses for printing. Other examples include fuser assemblies, developer assemblies, and so on, in the case of a laser printing device. In the case of a fluid-ejection (e.g., inkjet) device, consumable items can include replaceable fluid-ejection cartridges having both printheads and fluid (e.g., ink), as well as separately replaceable printheads and fluid supplies.

As a consumable item is used within a printing device for printing, its remaining life decreases until the item is depleted or exhausted and has to be replaced for printing to continue. The printing device may periodically (e.g., after each print job) estimate and thus track the remaining life of the consumable item. (The remaining life in this respect may not be able to be directly monitored; for example, the remaining toner in a toner cartridge may not be able to be directly measured, but rather estimated based on what has been printed using the toner.) In this way, the user of the device can monitor how much remaining life is left so as to know when a replacement should be ordered. The remaining life may also be reported to a cloud service that automatically ships a replacement to the user.

Some types of consumable items, such as toner cartridges, are not infrequently remanufactured for repeated usage. For example, a remanufacturer may receive an empty toner cartridge, refill it with toner, and potentially replace other components within the cartridge. The type of toner and the types of other components used by the remanufacturer may differ from those installed by the cartridge's original manufacturer.

A toner cartridge or other consumable item may include a memory that stores a counter encoding the remaining life of the cartridge. As the toner cartridge is used within a printing device for printing, the printing device can decrement the remaining life as encoded in the counter. The memory may be a one-way memory, in that the counter stored in the memory can be decremented or decreased, but is not able to be incremented or increased. (Or, similarly, the counter may be able to be incremented or increased but not decremented or decreased.)

A remanufacturer may therefore be unable to reset the remaining life of a toner cartridge as encoded within a counter stored on a memory of the cartridge, since resetting the remaining life means that the counter is increased. Even if the memory storing the counter is not a one-way memory, such that the remaining life can be reset by resetting the counter, the remanufacturer may not have the technical capability to reset the counter stored in the memory.

As a result, a printing device in which a remanufactured toner cartridge has been installed may not be able to track the remaining life of the cartridge. The end user or a cloud service is thus unable to monitor the remaining life of the cartridge, and will not be able to assess when a replacement cartridge should be ordered or shipped. The user may have to have an extra toner cartridge on hand for replacement purposes much earlier than if the remaining life of the installed cartridge were able to be monitored.

Techniques described herein ameliorate these and other issues. A user may newly install a toner cartridge within a printing device to replace an existing cartridge that has reached its end of life. The printing device may determine that a memory of the newly installed cartridge stores a counter encoding a remaining life that has already reached an end of life threshold. More generally, the device determines that the cartridge has previously been used, based on the remaining life of the cartridge.

In response, the printing device can conclude that the newly installed toner cartridge is a remanufactured cartridge that has been refilled or otherwise renewed by a remanufacturer other than the original equipment manufacturer (OEM) of the cartridge. The printing device may therefore reset the remaining life of the cartridge, such as by resetting the counter stored in the memory of the counter. However, the memory may be one-way memory that can be decremented but not incremented.

In this case, the counter may have its bits divided into a number of sub-counters and a selector field referencing which sub-counter currently indicates the remaining life of the toner cartridge. When the cartridge is first manufactured by an OEM, the bits of the counter are set to 1, with the selector field referencing the first sub-counter. The printing device decrements the first sub-counter during cartridge usage to track the remaining life of the cartridge.

After the toner cartridge has been returned to a remanufacturer and refilled or otherwise renewed, the next time the cartridge is newly installed within a printing device, the device determines that the selector field references a sub-counter (i.e., the first sub-counter) encoding a depleted remaining life. To reset the cartridge's remaining life, the printing device decrements the selector field to reference the next sub-counter, which is then used to track the remaining life during usage of the cartridge.

The techniques are particularly described herein by way of example in relation to a toner cartridge for a laser printing device. However, the techniques are not limited to usage in conjunction with a toner cartridge, and are more generally applicable to other types of consumable items for printing devices. Such other consumable items may also be for laser printing devices, or for other types of printing devices, such as inkjet printing devices.

FIG. 1A shows an example toner cartridge 100 that can be used within a laser printing device for printing. The toner cartridge 100 can include other components in addition to or other than those depicted in the figure, such as a waste bin, a wiper blade, a drum shutter, and so on. The cartridge 100 includes an enclosure 101 in which a photoconductor drum 108 is disposed that is made from a highly photoconductive material that is discharged by light photons. The photoconductor drum 108 may also be referred to as a photoreceptor drum, a photoconductor, an optical photoconductor, or an organic photoconductor.

The drum 108 is initially given a total positive (or alternatively negative) charge via a charge roller 110 disposed in the enclosure 101 of the cartridge 100. The charge roller 110 may be referred to as a primary charge roller and rotates counterclockwise. The charge roller 110 is in contact with the drum 108 during image formation on a sheet of media 120, such as paper, for precise alignment of the image to be formed on the media 120. At other times, during non-use, the charge roller 110 may be separated from the drum 108.

As the drum 108 revolves, a laser beam emanates from a laser beam light source 102 of the laser printing device onto a surface of the drum 108 to discharge certain points in accordance with an image. In this way, the laser draws, or scans, the image to be printed as a pattern of electrical charges, which can be referred to as an electrostatic image. The drum 108 rotates clockwise.

After the pattern has been set, the drum 108 is coated with charged toner 114, which is a fine powder, from a toner hopper 118 disposed in the enclosure 101 of the cartridge 100 via a developer roller 116 that is also disposed in the enclosure 101 and that may be a magnetic roller. The toner 114 may have a positive (or alternatively negative) charge. The toner 114 clings to the discharged areas of the drum 108, but not to the positively (or alternatively negatively) charged background.

Specifically, the toner 114 is dispensed by the developer roller 116 rotating against the drum 108 after having rotated through the toner hopper 118 to pick up the toner 114. The developer roller 116 may also be in contact with the drum 108 during image formation on the media 120 for precise alignment of the image to be formed on the media 120. At other times, during non-use, the developer roller 116 may be separated from the drum 108.

With the powder pattern affixed, the drum 108 rolls over a sheet of media 120, which moves from right to left. A transfer roller 124 of the laser printing device rotates in the opposite direction (i.e., counterclockwise) to the drum 108 to press the media 120 against the drum 108. The media 120 pulls the powder away from the drum 108. The media 120 moves at the same speed as the drum 108 and therefore picks up the image pattern exactly.

The media 120 finally passes between an upper fuser roller 132 and a lower pressure roller 134 that rotate in opposite directions. As the media 120 passes through these rollers 132 and 134, the loose toner 114 powder melts, fusing with the fibers in the media 120. The rollers 132 and 134 roll the media 120 to an output tray, providing a printed page.

The toner stored within the toner hopper 118 of the toner cartridge 100 is a single color. A single color (e.g., black-and-white) printing device may employ just one cartridge 100. By comparison, a multiple-color device can have multiple cartridges 100 of different colors installed therein. For certain components of the printing device, such as the transfer roller 124, there may be a corresponding component for each color of cartridge 100, whereas other components, such as the rollers 132 and 134, may be shared.

Figure 1B:
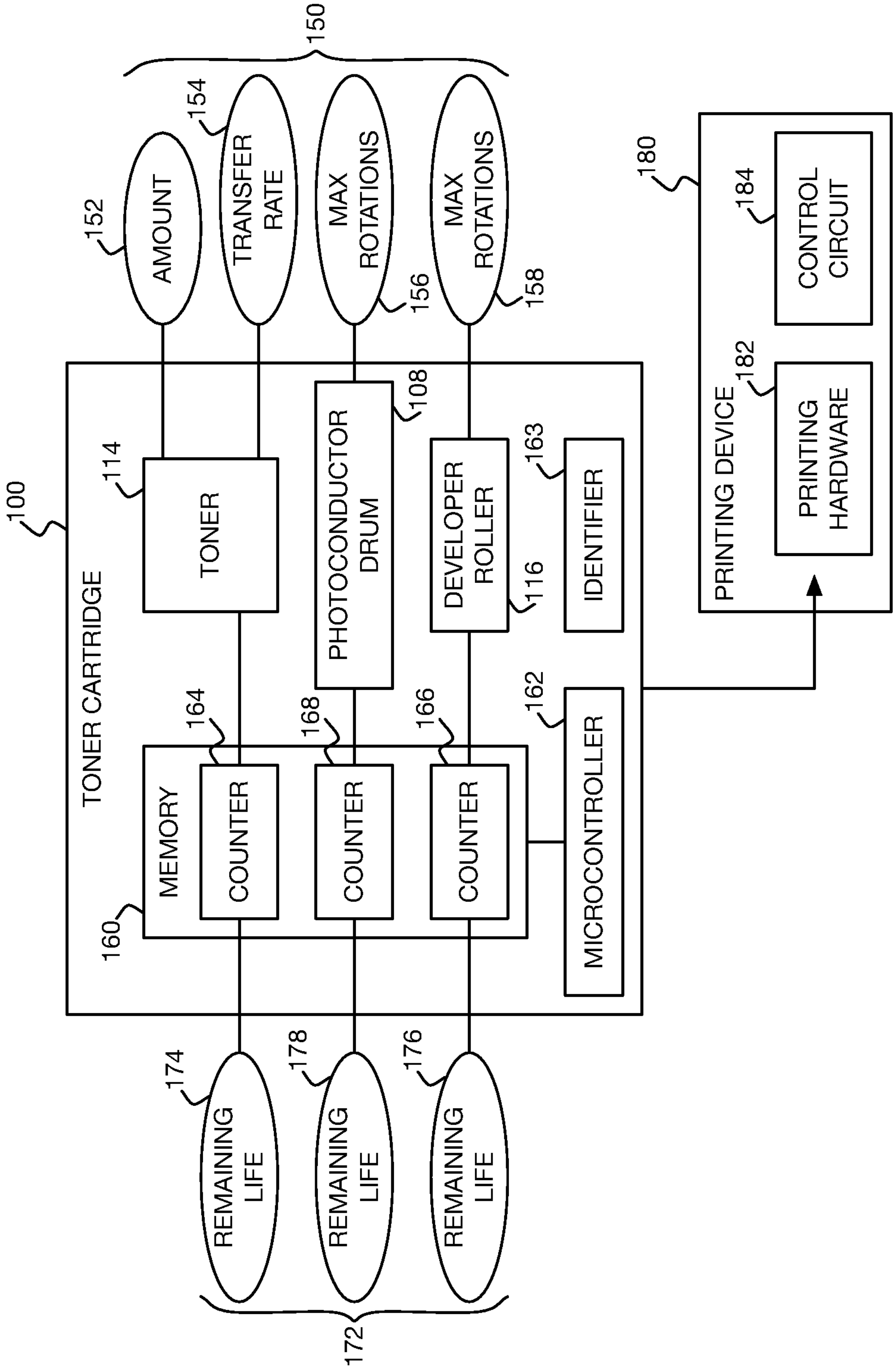

FIG. 1B shows parameters 150 that are particular to the toner cartridge 100 and that affect calculation of the estimated remaining life of the cartridge 100 when used in a laser printing device for printing. The parameters 150 can include the initially filled amount 152 of toner 114 in the cartridge 100. The parameters 150 can include the transfer rate 154 at which the toner 114 is depleted from the cartridge 100 when used by the laser printing device to print a pixel or other image unit.

The parameters 150 can include the maximum rotations 156 of the photoconductor drum 108. The maximum rotations 156 is the maximum number of times that the drum 108 can be rotated before the useful life of the drum 108 is exhausted. The parameters 150 can include the maximum rotations 158 of the developer roller 116, which similarly is the maximum number of times that the roller 116 can be rotated before its useful life is exhausted.

The estimated remaining life 172 of the cartridge 100 may be represented as the lowest of the remaining toner 114 within the cartridge 100, the remaining number of times the photoconductor drum 108 can be rotated, and the remaining number of times the developer roller 116 can be rotated. That is, the estimated remaining life 172 of the cartridge 100 may be represented as the lowest of the remaining life 174 of the toner 114, the remaining life 176 of the developer roller 116, and the remaining life 178 of the photoconductor drum 108.

The remaining life 174 of the toner 114 may be the percentage of toner 114 remaining in the cartridge 100. As toner 114 is depleted from the cartridge 100 for printing, the remaining life 174 can be calculated as the ratio of the difference between the initially filled amount of toner 114 and the product of the number of pixels (or other image units) that have been printed so far and the toner transfer rate 154, to the initially filled amount of toner 114—i.e., $$\text{Initially Filled Amount} - (\text{Pixels Printed} \times \text{Transfer Rate}) / \text{Initially Filled Amount}.$$

The remaining life 178 of the photoconductor drum 108 may be the percentage of the maximum number of rotations of the drum 108 that remain. As the photoconductor drum 108 is rotated, the remaining life 178 can be calculated as the ratio of the difference between the maximum rotations 156 and the number of times the drum 108 has been rotated so far, to the maximum rotations 156—i.e., $$(\text{Maximum Rotations} - \text{Number of Rotations}) / \text{Maximum Rotations}.$$

The remaining life 176 of the developer roller 116 may similarly be the percentage of the maximum number of rotations of the roller 116 that remain. As the developer roller 116 is rotated, the percentage of rotations of the roller 116 remaining can be similarly calculated as the ratio of the difference between the maximum rotations 158 and the number of times the roller 116 has been rotated so far to maximum rotations 158.

The estimated remaining life 172 of the cartridge 100 is thus the lowest of these three calculated percentages. The remaining life 172 of the cartridge 100 may be considered an estimated remaining life because the amount of toner 114 remaining within the cartridge 100 (viz., the remaining life 174) is not actually measured but rather is estimated from the number of pixels that have been printed and the expected toner transfer rate 154. The remaining life 172 of the cartridge 100 may also be considered an estimated remaining life because the maximum rotations 156 and 158 of the drum 108 and roller 116 (viz., the remaining lives 178 and 176) may be (pessimistically) estimated.

The toner cartridge 100 can include a memory 160, such as a non-volatile memory like a non-volatile semiconductor memory 160. The memory 160 stores counters 164, 166, and 168 that correspond to different components of the cartridge 100, specifically the toner 114, the photoconductor drum 108, and the developer roller 116 in the depicted example. The counters 164, 166, and 168 respectively encode the remaining life 174, 176, and 178 of their corresponding components.

In an implementation in which the memory 160 is a one-way memory in which the counters 164, 166, and 168 can be decremented but not incremented, the toner cartridge 100 may include a microcontroller 162. The microcontroller 162 can be an application-specific integrated circuit (ASIC). The microcontroller 162 hardware-enforces the one-way restriction of the memory 160. That is, the microcontroller 162 ensures that the counters 164, 166, and 168 are never decreased, and in this way the one-way restriction of the memory 160 is enforced in hardware.

The toner cartridge 100 may also include an identifier 163 that uniquely identifies the cartridge 100 in relation to other toner cartridges. The identifier 163 may in the form of a security-hardened IC that is readable just by corresponding security hardware of a printing device 180 such as a security-hardened ASIC. The identifier 163 may instead be in the form of a different type of electronically or electrically readable code, such as an RFID, an NFC tag, or a BLE identifier. The identifier 163 may be readable just when the cartridge 100 is installed within a printing device 180, and not readable when not installed within a printing device 180.

The identifier 163 may be stored on the memory 160. Stated another way, the memory 160 may be a security-hardened IC. The memory 160 may removable from another toner cartridge and reused in the toner cartridge 100. That is, the cartridge 100 in which the memory 160 is a part may not be the original toner cartridge in which the memory 160 was used.

When installed in the printing device 180, the toner cartridge 100 can be used by the device 180 for printing. For example, the printing device 180 may transfer the toner 114 onto sheets of media like paper to form images on the media. The printing device 180 may be a standalone printer, or an all-in-one (AIO) printing device that includes other functionality, such as scanning, copying, and/or faxing functionality, in addition to printing functionality.

The printing device 180 includes printing hardware 182 and a control circuit 184. The printing device 180 can include other components in addition to the printing hardware 182 and the control circuit 184 as well. The printing hardware 182 may be laser printing hardware in the case of a laser printing device, and inkjet printing hardware in the case of an inkjet printing device, for instance. The control circuit 184 performs functionality in relation to the counters 164, 166, and 168 and the identifier 163 as described later in the detailed description.

The control circuit 184 may be considered as including a processor and memory, which may more generally be considered as non-transitory computer-readable data storage medium. The processor and memory may be integrated within an ASIC, or the processor may be a general-purpose processor, in which case the memory may be a separate semiconductor or other type of memory. The control circuit 184 can execute instructions or program code. The control circuit 184 may be or include the noted security-hardened IC that can read the identifier 163.

Figure 2:
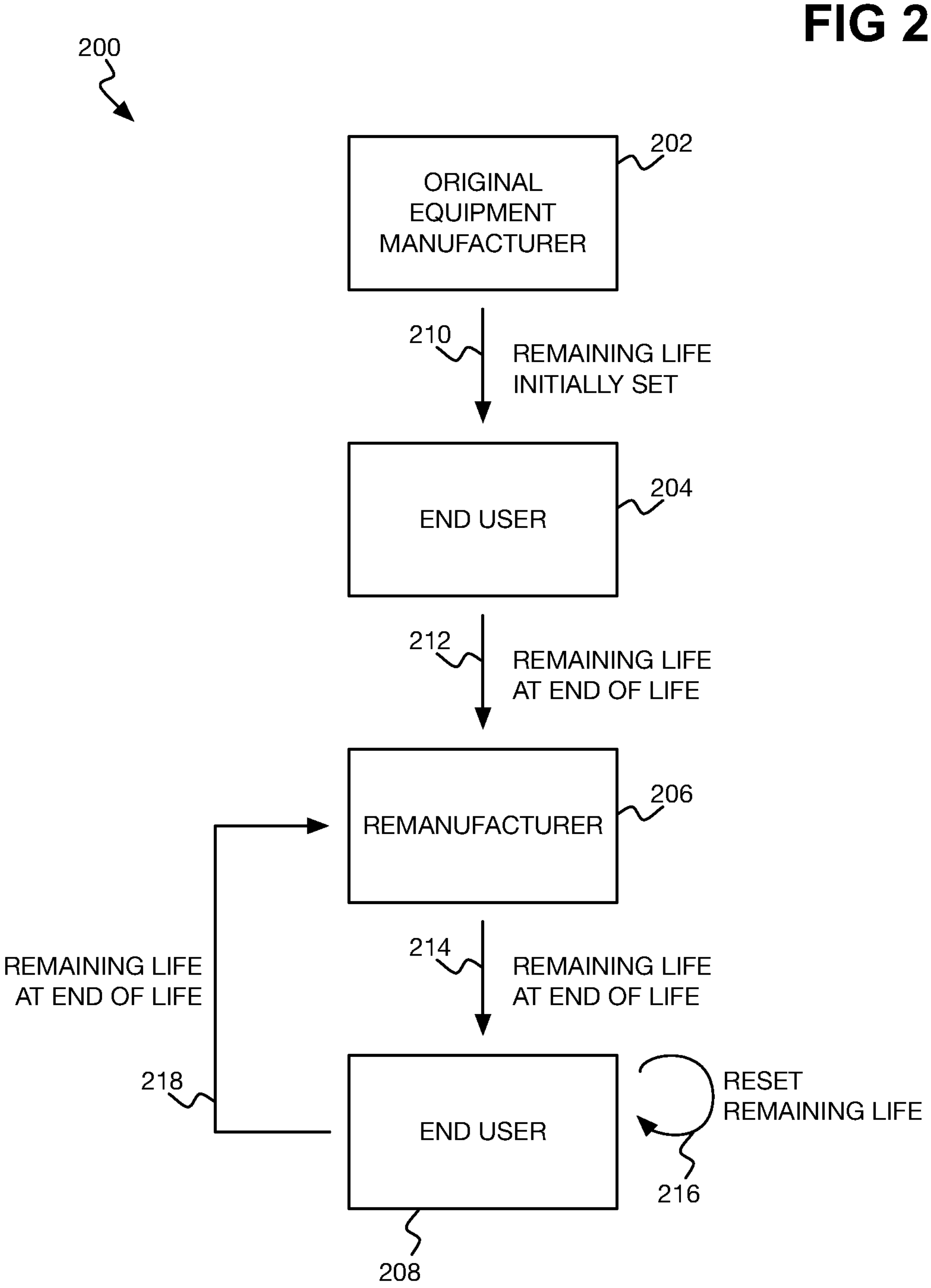
FIG. 2 is a diagram of an example process in which the remaining life of a toner cartridge is reset.

FIG. 2 shows an example process 200 that a toner cartridge 100 undergoes through its life. An OEM 202 initially or originally manufactures the cartridge 100. When the cartridge 100 is first manufactured, the counters 164, 166, and 168 are initially set to maximum values. Therefore, the remaining lives 174, 176, and 178 of respective components are set to maximum values, and the remaining life 172 of the cartridge 100 as a whole in turn is effectively set to a maximum value. The cartridge 100 is ultimately acquired by or provided to an end user 204 (210).

The end user 204 is the first end user of the toner cartridge 100. The end user 204 installs the cartridge 100 in a printing device 180, which uses the cartridge 100 to print. As the cartridge 100 is used for printing, the printing device 180 estimates the remaining lives 174, 176, and 178, and accordingly decrements their respective counters 164, 166, and 168. At some point the remaining life 172 of the cartridge 100 will have reached end of life (i.e., become exhausted or depleted), and the cartridge 100 replaced within the printing device 180. A remanufacturer 206 may ultimately acquire the cartridge 100 after the remaining life 172 has reached end of life (212).

The remanufacturer 206 remanufactures the toner cartridge 100, by refilling the toner 114 and/or replacing the photoconductor drum and/or the developer roller 116, or by otherwise renewing the cartridge 100 so that it can be used again. However, the remanufacturer 206 is unable to or does not reset the counters 164, 166, and 168. Therefore, the overall remaining life 172 of the cartridge 100 still indicates that the cartridge 100 has reached end of life. With the cartridge 100 in this state—ready to be used again but with the remaining life 172 being indicated as having reached end of life—another end user 208 is provided or acquires the cartridge 100 (214).

The usage of the cartridge 100 by the end user 208 is not the first usage of the cartridge 100. The end user 208 installs the cartridge 100 in a different printing device 180. The printing device 180 recognizes that the cartridge 100 has previously been used, such as by determining that the remaining life 172 is still indicated as having reached end of life. The printing device 180 may thus conclude that the cartridge 100 has been remanufactured.

Therefore, the printing device 180 resets the remaining life 172 of the toner cartridge 100 (216). For instance, the printing device 180 may reset each of the remaining lives 174, 176, and 178 by resetting their corresponding counters 164, 166, and 168. As before, as the cartridge 100 is used for printing, the printing device 180 estimates the remaining lives 174, 176, and 178, and accordingly decrements their respective counters 164, 166, and 168.

At some point the remaining life 172 of the toner cartridge 100 will again have reached end of life (i.e., become exhausted or depleted), and the cartridge 100 replaced within the printing device 180. The above described process 200 is then repeated with the same or different remanufacturer 206 ultimately acquiring the cartridge 100 after the remaining life 172 has again reached end of life (218). The cartridge 100 may be able to be remanufactured a number of times before it no longer can be renewed for reusage by another end user 208.

Figure 3:
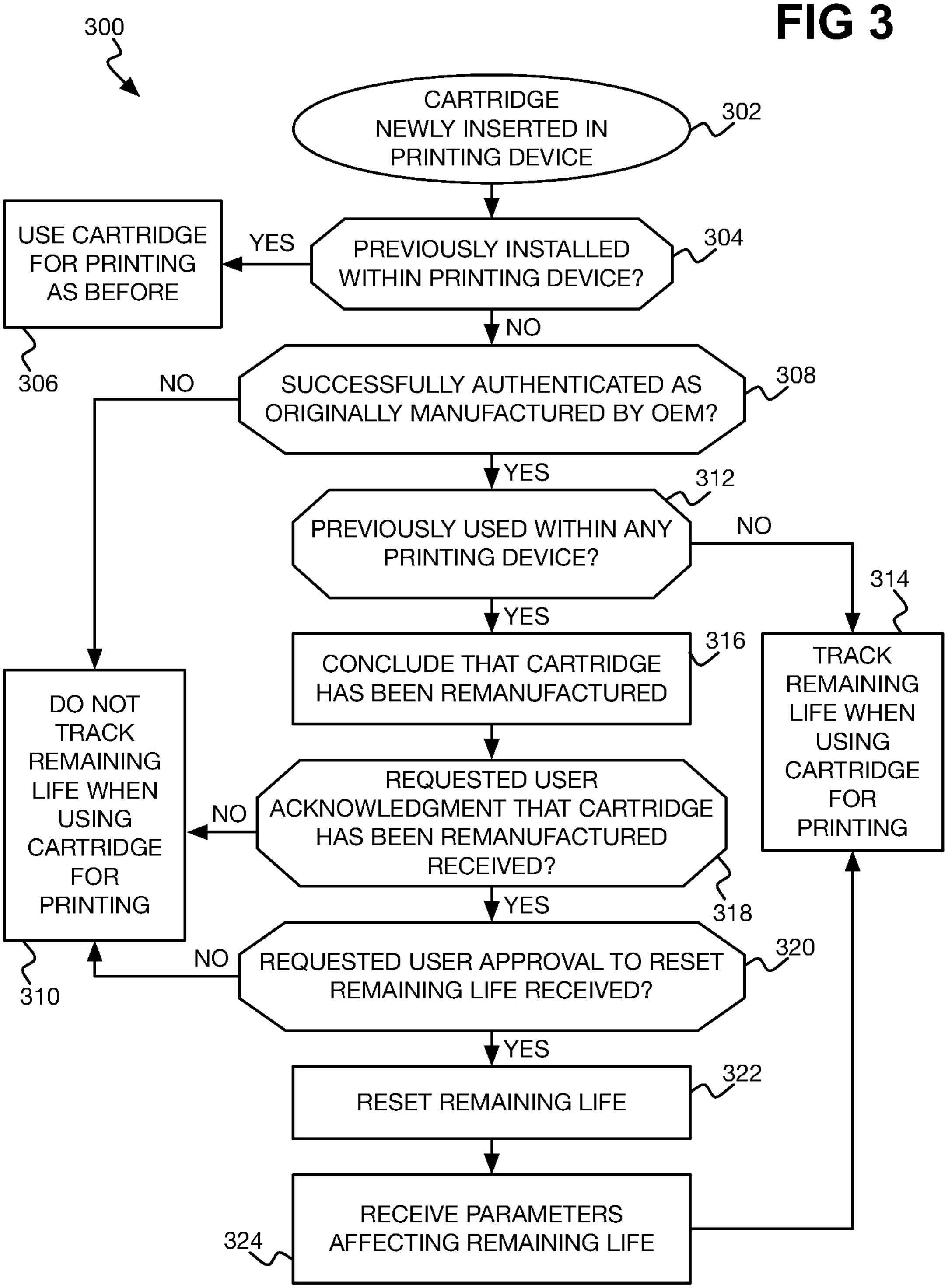
FIG. 3 is a diagram of an example method for resetting the remaining life of a toner cartridge.

FIG. 3 shows an example method 300 for resetting the remaining life 172 of a toner cartridge 100. The method 300 can be performed by the printing device 180, such as by its control circuit 184. The method 300 begins with the cartridge 100 having been newly installed within the printing device 180 (302). Therefore, the printing device 180 determines whether the cartridge 100 has been previously installed within the device (304). If so, the cartridge 100 is used for printing as before (306), with the remaining life 172 tracked or not tracked as before.

For instance, the toner cartridge 100 may have been temporarily removed from the printing device 180 by a user to shake to uniformly redistribute or level the toner 114 within the cartridge 100. When the cartridge 100 is reinstalled within the printing device 180, the device 180 recognizes that the cartridge 100 was previously installed within the device 180. If the printing device 180 had previously been tracking the remaining life 172 of the cartridge 100, the device 180 continues to track the remaining life 172. If the printing device 180 had not previously been tracking the remaining life 172 of the cartridge 100, the device 180 continues not to track the remaining life 172.

The printing device 180 can determine whether the toner cartridge 100 has previously been installed within the device 180 based on the identifier 163 of the cartridge 100. When the cartridge 100 is newly inserted into the printing device 180, the device 180 may read the identifier 163. The printing device 180 compares the identifier 163 with those of one or multiple toner cartridges that were most recently installed within the device 180 to determine if the cartridge 100 was previously installed in the device 180. If the cartridge 100 was not previously installed in the printing device 180, the device 180 may store the identifier 163.

In response to determining that the toner cartridge 100 was not previously installed within the printing device 180, the device 180 may authenticate the cartridge 100 as to whether or not the cartridge 100 was originally manufactured by the OEM 202 (308). If the cartridge 100 is not successfully authenticated, then the printing device 180 may not track the remaining life 172 of the cartridge 100 when using the cartridge 100 for printing (310). For instance, the printing device 180 may not decrement the counters 164, 166, and 168 during usage.

The printing device 180 may authenticate the toner cartridge 100 in a number of different ways. As one example, the printing device 180 may transmit the identifier 163 over a network to a cloud service managed by or for the OEM 202, with the cloud service indicating whether the cartridge 100 was originally manufactured by the OEM 202. As another example, the printing device 180 may be able to verify using a public cryptographic key of the OEM 202 that the identifier 163 has been digitally signed by the corresponding private cryptographic key of the OEM 202.

In response to successfully authenticating the toner cartridge 100, the printing device 180 may determine whether the cartridge 100 was previously used (312), such as within any printing device. The printing device 180 may in this respect determine that the remaining life 172 of the cartridge 100 is indicated as having reached end of life. For example, the printing device 180 may determine that any of the remaining lives 174, 176, and 178 encoded within their respective counters 164, 166, and 168 has reached (e.g., is less than or equal to) a corresponding end of life threshold.

If the toner cartridge 100 was not previously used, the cartridge 100 may be brand new, and not have had been remanufactured by a remanufacturer 206. The printing device 180 therefore tracks the remaining life 172 of the cartridge 100 when using the cartridge 100 for printing (314), without first resetting the remaining life 172. In response to determining that the cartridge 100 was previously used, however, the printing device 180 can conclude that the cartridge 100 has been remanufactured (316).

The printing device 180 may request user acknowledgment that the toner cartridge 100 has been remanufactured (318). For example, either on a control panel of the printing device 180 or via an embedded web server (EWS) of the device 180 as accessed by an end user client device, the device 180 may notify the end user 208 that the cartridge 100 has been remanufactured. If the printing device 180 does not receive user acknowledgment that the cartridge 100 has been remanufactured, such as by the user selecting "cancel" instead of "OK" on the control panel or via the EWS, the device 180 may not track the remaining life 172 during usage of the cartridge 100 (310).

In response to the user acknowledging that the toner cartridge 100 has been remanufactured, such as by selecting "OK" instead of "cancel" on the control panel or via the EWS, the printing device 180 may also request user approval to reset the remaining life 172 of the cartridge 100 (320). The printing device 180 may request such approval by asking via the control panel or the EWS whether the end user 208 wishes to reset the remaining life 172 so that it can again be tracked when the cartridge 100 is used. If the printing device 180 does not receive user approval to reset the remaining life 172, the device does not track the remaining life 172 during cartridge usage (310).

In response to receiving user approval, the printing device 180 can reset the remaining life 172 of the toner cartridge 100 (322). The printing device 180 may reset each of the remaining lives 174, 176, and 178 corresponding to different components of the device 180, such as by resetting their respective counters 164, 166, and 168. If the memory 160 storing the counters 164, 166, and 168 is a one-way memory, the printing device 180 may reset the counters 164, 166, and 168 as described in detail later in the detailed description.

It is noted that installation of different types of components (including toner 114 both as to its type and amount) in the toner cartridge 100 during remanufacture can result in inaccurate estimation of the remaining life 172 during subsequent usage for printing. The OEM-specific or nominal parameters may be particular to the originally installed components, and not to the remanufacturer 206's components that are now in the cartridge 100. Because the parameters do not accurately reflect the remanufacturer 206's components, the estimated remaining life 172 that is calculated based on the parameters may be inaccurate.

Therefore, the printing device 180 may also receive updated parameters particular to the toner cartridge 100 as remanufactured and that affect calculation of the remaining life 172 of the cartridge when used for printing (324). The end user 208 may enter the parameters via the control panel or the EWS of the printing device 180. The parameters may be stored on the memory 160 of the cartridge 100 and read by the printing device 180. The printing device 180 may receive the parameters from a cloud service based on the identifier 163 of the cartridge 100. The printing device 180 tracks the remaining life 172 of the cartridge 100 during usage based on the parameters (314).

Figure 4A:
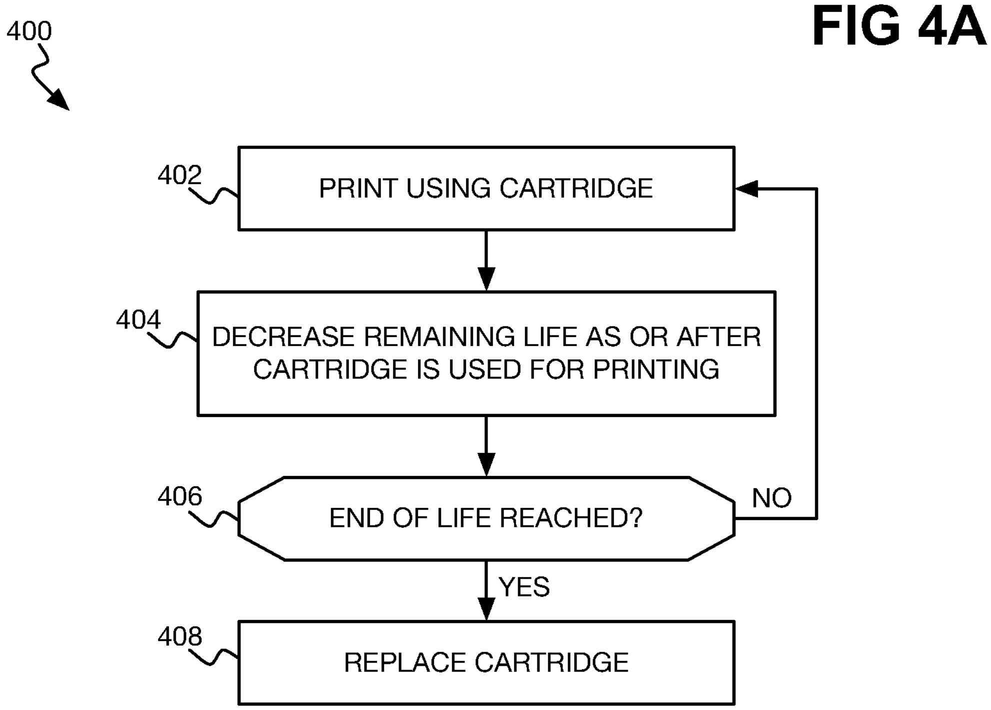
FIG. 4A is a diagram of an example method in which the remaining life of a toner cartridge is tracked during usage.

FIG. 4A shows an example method 400 in which the remaining life 172 of the toner cartridge 100 is tracked during usage within the printing device 180 for printing. The printing device 180 performs the method 400 after 314 of the method 300. The printing device 180 prints using the cartridge 100 (402). As or after the cartridge 100 is used for printing, the printing device 180 decreases the remaining life 172 of the cartridge 100 (404).

For example, the printing device 180 may calculate each of the estimated remaining lives 174, 176, and 178 corresponding to different components of the toner cartridge 100. The printing device 180 then accordingly decrements the counters 164, 166, and 168 that encode the remaining lives 174, 176, and 178. This process continues until the overall remaining life 172 of the cartridge 100 has reached end of life (406), at which time the cartridge 100 may ultimately be replaced by a new toner cartridge (408).

Figure 4B:
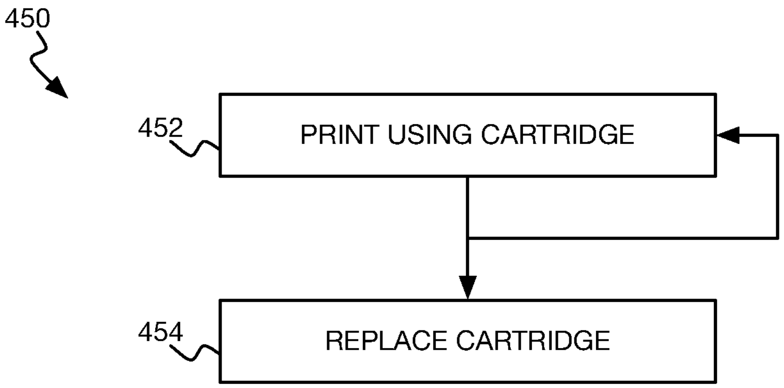
FIG. 4B is a diagram of an example method in which the remaining life of a toner cartridge is not tracked during usage.

FIG. 4B shows an example method 450 in which the remaining life 172 of the toner cartridge 100 is not tracked during usage within the printing device 180 for printing. The printing device 180 performs the method 450 after 310 of the method 300. The printing device 180 prints using the cartridge 100 (452). This continues until the end user 204/208 him or herself visually or otherwise identifies that the cartridge 100 has reached end of life (viz., as opposed to the printing device 180 tracking the remaining life 172), at which time the cartridge 100 may be replaced by a new toner cartridge (454).

Figure 5:
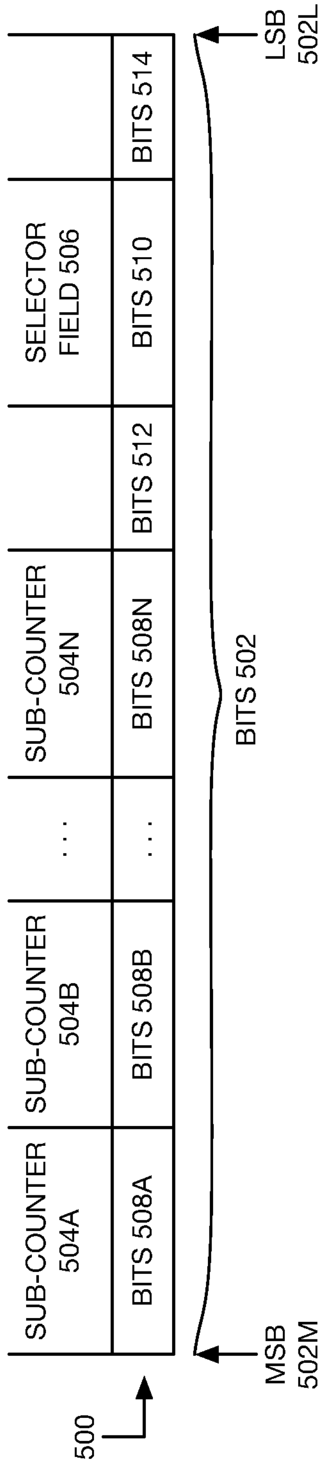
FIG. 5 is diagram of an example counter encoding the remaining life of a toner cartridge.

FIG. 5 shows an example counter 500 that can be used when the memory 160 storing the counter 500 is a one-way memory, such that the counter 500 can be decreased but not increased in value. Each of the counters 164, 166, and 168 may be a separate instance of the counter 500. The counter 500 encodes a remaining life, such as the remaining life 174, 176, or 178. More generally, the counter 500 is said to encode a count value.

The counter 500 is stored in the memory 160 as, and thus has, a number of bits 502, from a most-significant bit (MSB) 502M to a least-significant bit (LSB) 502L. At initial manufacture of the toner cartridge 100, the bits 502 are each set to 1 within the memory 160. Therefore, at initial manufacture of the cartridge 100, the overall value of the counter 500 as encoded within the bits 502 is at a maximum value.

The bits 502 of the counter 500 are logically divided into multiple sub-counters 504A, 504B, . . . , 504N and a selector field 506. The sub-counters 504A, 504B, . . . , 504N have respective adjacent bits 508A, 508B, . . . , 508N, and the selector field 506 has respective adjacent bits 510. The sub-counters 504A, 504B, . . . , 504N are collectively referred to as the sub-counters 504, and their respective bits 508A, 508B, . . . , 508N are collectively referred to as the bits 508.

Not all bits 502 of the counter 500 may be used. As depicted in the example, there may be bits 512 between the bits 508N of the last sub-counter 504N and the bits 510 of the selector field 506. There may also or instead be bits 514 after the bits 510 of the selector field 506. As another example, there may also or instead be bits before the bits 508A of the first sub-counter 504A, and/or between the bits 508 of consecutive sub-counters 504.

The bits 508A of the first sub-counter 504A are more significant within the counter 500 than the bits 508 of any other sub-counter 504. The bits 508N of the last sub-counter 504N are less significant within the counter 500 than the bits 508 of any other sub-counter 504. In the depicted example, the bits 510 of the selector field 506 are less significant than the bits 508 of every sub-counter 504.

The selector field 506 references which sub-counter 504 currently indicates the remaining life encoded within the counter 500. For example, the selector field 506 may have descending values A, B, . . . , N. When the selector field 506 has a value of A, the sub-counter 504A currently indicates the remaining life encoded within the counter 500. By comparison, when the selector field 506 has a value of B or N, the sub-counter 504B or 504N, respectively, currently indicates the remaining life.

Figure 6:
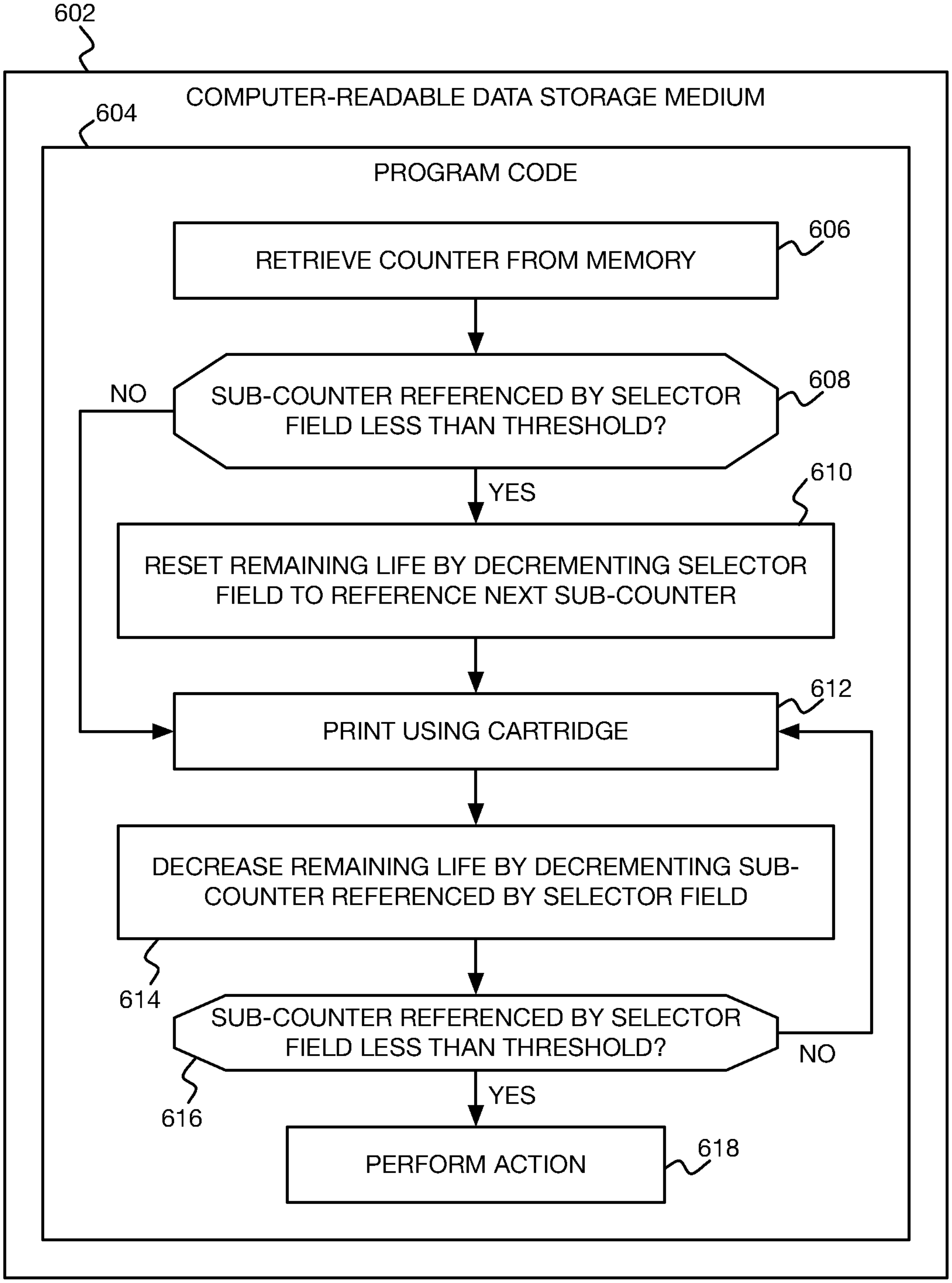
FIG. 6 is a diagram of an example non-transitory computer-readable data storage medium storing program code executable to perform a process for resetting and tracking the remaining life of a toner cartridge encoded within a counter.

FIG. 6 shows an example non-transitory computer-readable data storage medium 602 storing program code 604 that is executable to perform processing. The printing device 180, such as the control circuit 184 thereof, can execute the program code 604, and the processing is described as such. More generally, a computing or electronic device other than a printing device 180 may execute the program code 604, including in an implementation in which the counter 500 encodes a count value that is not the remaining life 174, 176, or 178 of a corresponding component of a toner cartridge 100.

Upon the toner cartridge 100 being installed within the printing device 180, the device 180 retrieves the counter 500 from the memory 160 of the cartridge 100 (606). The printing device 180 determines whether the sub-counter 504 referenced by the selector field 506 is less than an end of life threshold (608). At initial manufacture of the cartridge 100 by the OEM 202, the selector field 506 will have a value referencing the first sub-counter 504A, and all the sub-counters 504 will store a maximum value.

As the end user 204 uses the toner cartridge 100 after initial manufacture, the printing device 180 will track the remaining life 174, 176, or 178 of the component to which the counter 500 corresponds by decrementing the sub-counter 504A. When the cartridge 100 has reached end of life, the value of the sub-counter 504A may therefore be below the threshold. However, the other sub-counters 504 will remain at their initial maximum values.

If the sub-counter 504 referenced by the selector field 506 is less than the threshold, then the printing device 180 resets the remaining life 174, 176, or 178 encoded by the counter 500 by decrementing the selector field 506 to reference the next sub-counter 504 (610). When the end user 208 installs the toner cartridge 100 after remanufacture, the selector field 506 will still reference the first sub-counter 504A that was decremented during prior usage by the end user 204.

Therefore, even though the toner cartridge 100 has been refilled with toner 114 and otherwise renewed, the selector field 506 still references a first sub-counter 504A that may still indicate that the remaining life 174, 176, or 178 has been depleted or exhausted. Decrementing the selector field 506 results in the field 506 having a value referencing the next, second sub-counter 504B, so that the remaining life 174, 176, or 178 can be tracked after remanufacture of the cartridge 100.

The printing device 180 prints using the toner cartridge 100 (612), and during or after usage of the cartridge 100, decreases the remaining life 174, 176, or 178 encoded by the counter 500 by decrementing the sub-counter 504 referenced by the selector field 506 (614). At initial manufacture of the cartridge 100, the selector field 506 references the sub-counter 504A. Therefore, during usage of the cartridge 100 by the end user 204, the sub-counter 504A indicates the remaining life 174, 176, or 178 and is decremented.

After the toner cartridge 100 is remanufactured the first time, the selector field 506 will be decremented to reference the sub-counter 504B. The sub-counter 504B therefore indicates the remaining life 174, 176, or 178 after first remanufacture, and will be decremented during usage of the cartridge 100. More generally, after each time the cartridge 100 is remanufactured, the selector field 506 will be decremented so that the next sub-counter 504 is decremented during usage of the cartridge 100.

Until the sub-counter 504 referenced by the selector field 506 drops below the end of life threshold (616), the printing device 180 may continue to print using the toner cartridge 100 (612) and accordingly decrement this sub-counter (614). Once the referenced sub-counter 504 is less than the threshold (616), the printing device 180 may perform an action (618). The printing device 180 may notify the end user 204 or 208 that a replacement cartridge should be ordered, may notify a cloud service to automatically ship a replacement cartridge, and/or may no longer print using the cartridge 100.

FIGS. 7A, 7B, 7C, 7D, 7E, 7F, 7G, and 7H depict example performance of the counter 500 in an implementation in which the counter 500 is a 32-bit counter. The bits 502 of the counter are logically divided into four seven-bit sub-counters 504A, 504B, 504C, and 504D having bits 508A, 508B, 508C, and 508D, respectively, and a two-bit selector field 506 having two bits 510, with two bits remaining unused. Therefore, each sub-counter 504 can store a value between 0 and 127, and the selector field 506 can store a value between 0 and 3.

Figures 7A, 7B, 7C, 7D, 7E, 7F, 7G, 7H:
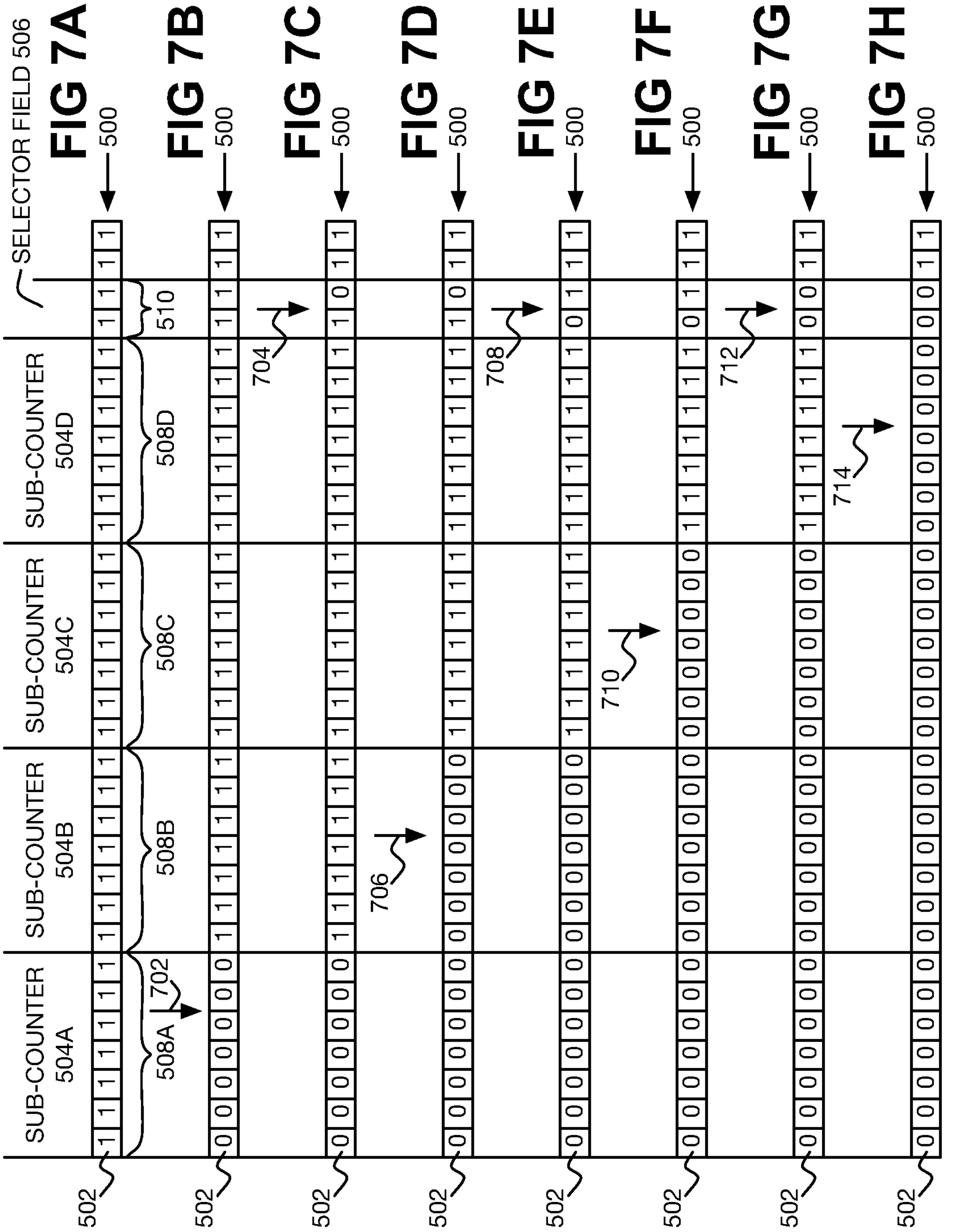
FIGS. 7A, 7B, 7C, 7D, 7E, 7F, 7G, and 7H are diagrams depicting example performance of the process of FIG. 6.

Per FIG. 7A, at initial manufacture the bits 502 are all set to 1. The selector field 506 thus stores a value of 3, which corresponds to the first sub-counter 504A. Therefore, the sub-counter 504A first indicates the count value of the counter 500, beginning with a maximum value of 127, and is decremented per arrow 702. Per FIG. 7B, at some point the sub-counter 504A may reach a minimum value of 0, or otherwise drop below a threshold. To reset the count value of the counter 500 back to the maximum value of 127, the selector field 506 is decremented per arrow 704.

Per FIG. 7C, the selector field 506 now stores a value of 2, which corresponds to the second sub-counter 504B. Therefore, the sub-counter 504B now indicates the count value of the counter 500, beginning with the maximum value of 127, and is decremented per arrow 706. Per FIG. 7D, at some point the sub-counter 504B may reach the minimum value of 0, or otherwise drop below the threshold. To reset the count value of the counter 500 back to the maximum value of 127, the selector field 506 is decremented per arrow 708.

Per FIG. 7E, the selector field 506 now stores a value of 1, which corresponds to the third sub-counter 504C. Therefore, the sub-counter 504C now indicates the count value of the counter 500, beginning with the maximum value of 127, and is decremented per arrow 710. Per FIG. 7F, at some point the sub-counter 504C may reach the minimum value of 0, or otherwise drop below the threshold. To reset the count value of the counter 500 back to the maximum value of 127, the selector field 506 is decremented per arrow 712.

Per FIG. 7G, the selector field now stores a value of 0, which corresponds to the last sub-counter 504D. Therefore, the sub-counter 504D now indicates the count value of the counter 500, beginning with the maximum value of 127, and is decremented per arrow 714. Per FIG. 7H, at some point the last sub-counter 504D may also reach the minimum value of 0, or otherwise drop below the threshold. The 32-bit counter 500 can therefore have its count value reset a total of three times and can be used a total of four times.

The counter 500 may correspond to a percentage that is decremented from 100% to 0%. Because each sub-counter 504 has seven bits, the counter 500 can be decremented in units of $100/(2^7)$. By comparison, if all 32 bits of the counter 500 had been used to currently indicate the count value, the counter 500 could have been decremented in more granular units of $100/(2^{32})$. However, if the counter 500 is stored in a one-way memory 160, the counter 500 could not be then reset as when sub-counters 504 are employed.

Techniques have been described for resetting the remaining life of a consumable item for a printing device. The remaining life of the consumable item can therefore be tracked during usage even after the item has been remanufactured. If the remaining life is encoded within a counter that can be decremented and not incremented, the remaining life can still be reset by logically dividing the counter into sub-counters and a selector field.

We claim:

1. A method comprising:

determining, by a printing device, that a consumable item newly installed within the printing device has previously been used, based on a remaining life of the consumable item; and in response to determining that the consumable item newly installed within the printing device has previously been used, resetting, by the printing device, the remaining life.

2. The method of claim 1, further comprising:

printing, by the printing device, using the consumable item; and as or after the consumable item is used in for printing, decreasing, by the printing device, the remaining life.

3. The method of claim 2, further comprising:

receiving parameters particular to the consumable item and that affect calculation of the remaining life of the consumable item when used for printing, wherein the remaining life is decreased as or after the consumable item is used for printing by calculating the remaining life based on the received parameters.

4. The method of claim 1, further comprising:

successfully authenticating, by the printing device, the consumable item newly installed within the printing device as having been originally manufactured by an original equipment manufacturer (OEM), based on an identifier of the consumable item, wherein the remaining life is reset further in response to successfully authenticating the consumable item.

5. The method of claim 1, further comprising:

in response to determining that the consumable item has previously been used, concluding, by the printing device, that the consumable item has been remanufactured by a remanufacturer after having been originally manufactured by an original equipment manufacturer (OEM); and requesting and receiving, by the printing device, user acknowledgment that the consumable item newly installed within the printing device has been remanufactured, wherein the remaining life is reset further in response to receiving the user acknowledgment that the consumable item has been remanufactured.

6. The method of claim 1, further comprising:

determining, by the printing device, that the consumable item newly installed within the printing device was not previously installed within the printing device, wherein the remaining life is reset further in response to determining that the consumable item was not previously installed within the printing device.

7. The method of claim 1, wherein determining that the consumable item has previously been used comprises:

determining that the consumable item had previously reached an end of life.

8. The method of claim 1, wherein the consumable item includes a memory storing a counter that is decrementable and not incrementable, the counter encoding the remaining life and having a plurality of bits logically divided into a plurality of sub-counters and a selector field referencing which sub-counter currently indicates the remaining life.

9. The method of claim 8, wherein the determining that the consumable item has previously been used comprises:

determining that the sub-counter referenced by the selector field is less than a threshold corresponding to the consumable item having reached an end of life.

10. The method claim 8, wherein resetting the remaining life comprise:

decrementing of the selector field such that the selector field references a next sub-counter that has not previously been used to indicate the remaining life.

11. A printing device comprising:

printing hardware; and a control circuit to:

upon a consumable item being newly installed within the printing device, retrieve a counter from a memory of the consumable item that is decrementable and not incrementable, the counter encoding a remaining life and having a plurality of bits logically divided into a plurality of sub-counters and a selector field referencing which sub-counter currently indicates the remaining life; and in response to the selector field referencing a sub-counter that has been previously used such that the consumable item newly installed within the printing device has been previously used, reset the remaining life by decrementing the selector field such that the selector field references a next sub-counter that has not previously been used to indicate the remaining life.

12. The printing device of claim 11, wherein as the consumable item is used in conjunction with the printing hardware for printing, the control circuit is to decrease the remaining life by decrementing the sub-counter referenced by the selector field.

13. The printing device of claim 11, wherein each sub-counter corresponds to a different adjacent number of the bits of the counter to encode the remaining life, wherein the sub-counters include a first sub-counter that indicates the remaining life before any other sub-counter does, and a last sub-counter that indicates the remaining life after every other sub-counter does, wherein the bits to which the first sub-counter correspond are more significant within the counter than the bits to which any other sub-counter corresponds, and wherein the bits to which the last sub-counter correspond are less significant within the counter than the bits to which every other sub-counter corresponds.

14. The printing device of claim 13, wherein the selector field corresponds to an adjacent number of the bits of the counter to encode which sub-counter currently indicates the remaining life, and wherein the bits to which the selector field corresponds are less significant within the counter than the bits to which every sub-counter corresponds.

15. The printing device of claim 11, wherein the counter is one of a plurality of counters of the consumable item, each counter corresponding to the remaining life of a different component of the consumable item, wherein as the consumable item is used in conjunction with the printing hardware for printing, the control circuit is to decrease the remaining life of the different component to which each counter corresponds at a respective rate, and wherein the remaining life of the consumable item corresponds to the remaining life of the different component having a lowest remaining life.

16. The printing device of claim 11, wherein the consumable item includes a microcontroller to hardware-enforce the memory so that the counter cannot be incremented.

17. A non-transitory computer-readable data storage medium storing program code executable by a processor of a printing device to perform processing comprising:

retrieving a counter from a memory of a consumable item that has been newly installed within the printing device, the counter being decrementable and not incrementable, the counter encoding a count value, and the counter having a plurality of bits logically divided into a plurality of sub-counters and a selector field referencing which sub-counter currently indicates the count value of the counter; and in response to the selector field referencing a sub-counter that has been previously used such that the consumable item newly installed within the printing device has been previously used, resetting the count value of the counter by decrementing the selector field such that the selector field references a next sub-counter that has not previously been used to indicate the count value of the counter.

18. The non-transitory computer-readable data storage medium of claim 17, wherein the processing further comprises:

decreasing the count value of the counter by decrementing the sub-counter referenced by the selector field.

19. The non-transitory computer-readable data storage medium of claim 17, wherein each sub-counter corresponds to a different adjacent number of the bits of the counter to encode the count value, wherein the sub-counters include a first sub-counter that indicates the count value before any other sub-counter does, and a last sub-counter that indicates the count value after every other sub-counter does, wherein the bits to which the first sub-counter correspond are more significant within the counter than the bits to which any other sub-counter corresponds, and wherein the bits to which the last sub-counter correspond are less significant within the counter than the bits to which every other sub-counter corresponds.

20. The non-transitory computer-readable data storage medium of claim 19, wherein the selector field corresponds to an adjacent number of the bits of the counter to encode which sub-counter currently indicates the count value of the counter, and wherein the bits to which the selector field corresponds are less significant within the counter than the bits to which every sub-counter corresponds.

* * * * *